(No Model.)
J. HARTNESS.
CHUCK.
No. 507,904. Patented Oct. 31, 1893.
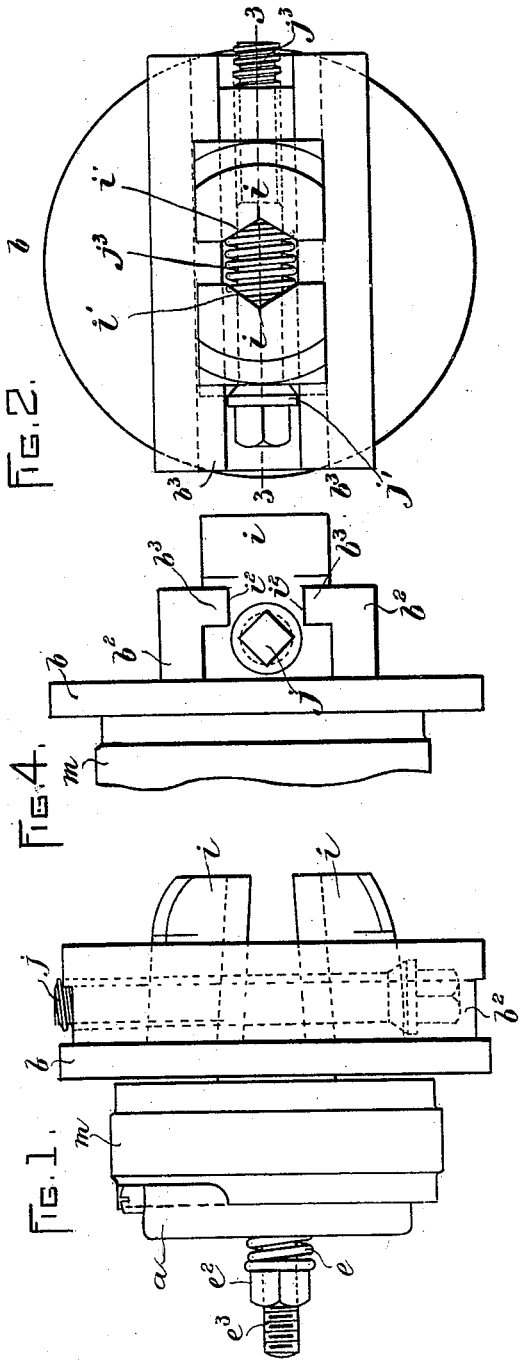
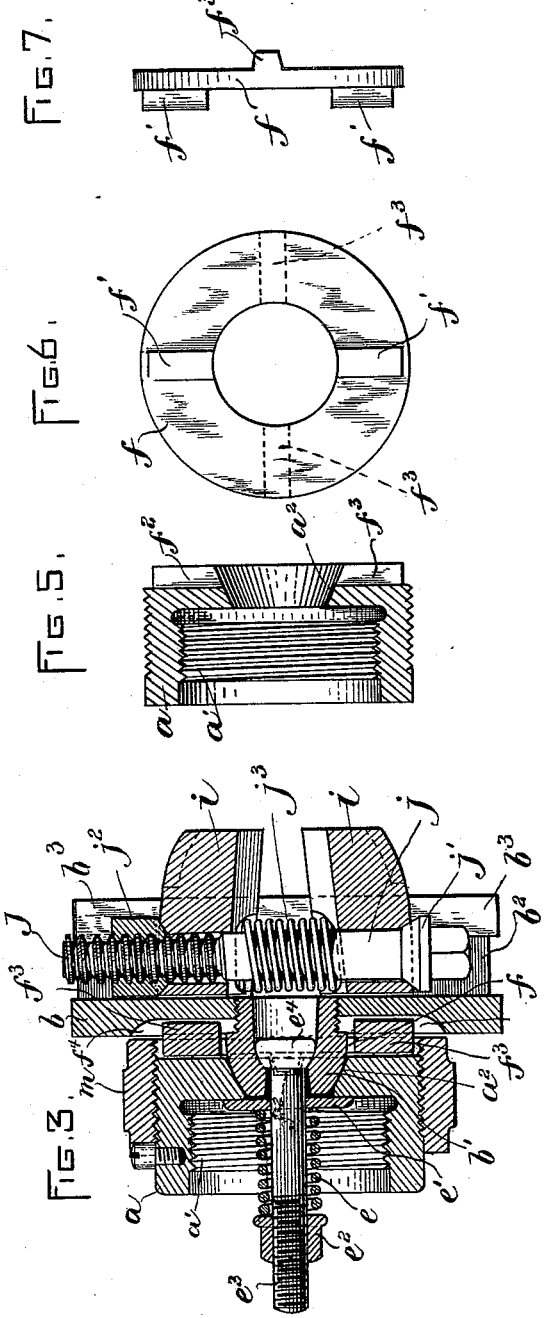
WITNESSES:
K. E. Brown
A. D. Harrison.
INVENTOR:
J. Hartness
by Knight Brown Quinby
Attys.

UNITED STATES PATENT OFFICE.

JAMES HARTNESS, OF SPRINGFIELD, VERMONT.

CHUCK.

SPECIFICATION forming part of Letters Patent No. 507,904, dated October 31, 1893.

Application filed November 19, 1892. Serial No. 452,604. (No model.)

*To all whom it may concern:*

Be it known that I, JAMES HARTNESS, of Springfield, in the county of Windsor and State of Vermont, have invented certain new and useful Improvements in Chucks, of which the following is a specification.

This invention relates to chucks for use in lathes, and particularly turret lathes or equivalent machines, in which the chuck is used to rotate a piece of work and present it while rotating to a turning tool.

The invention has for its object to provide a chuck in which the jaws that hold the work shall be flexibly connected with the part by which they are supported and rotated, so that the work, while rotating, may stand at an angle to the axis of the chuck, in order that the turning tool may impart a tapering form to the work.

To this end the invention consists in the improvements which I will now proceed to describe and claim.

Of the accompanying drawings, forming part of this specification: Figure 1 represents a side elevation of a chuck constructed in accordance with my invention. Fig. 2 represents an end view of the same. Fig. 3 represents a section on line 3—3, Fig. 2. Fig. 4 represents an elevation of a portion of the chuck as viewed from the left in Fig. 2. Fig. 5 represents a sectional view of the part of the chuck which is hereinafter termed the supporting section. Figs. 6 and 7 represent respectively a side and an edge view of the part hereinafter termed the driver.

The same letters of reference indicate the same parts in all the figures.

In the drawings: $a$ represents a portion of the chuck which, in practice, is rigidly secured to the work-rotating spindle, said section being here shown as internally screw-threaded at $a'$ to engage an external thread formed upon the spindle.

$b$ represents the jaw-carrying portion of the chuck, which is flexibly connected with the supporting section $a$, so that it may rock or oscillate freely to a limited extent; and is provided with a loose rotative engagement with the supporting section so that, when the spindle is rotated, rotary motion is imparted from the supporting section to the jaw-carrying section, and the latter is permitted to stand in an inclined position relatively to the axis of the spindle, so that the work held by the jaws of the chuck may occupy a similarly inclined position, the result being the turning of a tapering surface upon the work when the cutting tool is moved gradually in a direction at right angles to the axis of the work during the turning operation.

The means for flexibly connecting the jaw-holding section with the supporting section, and the means for rotatively connecting the two sections, may be variously modified. The construction shown in the drawings is the best at present known to me, and I will now describe the same. The supporting section $a$ has an internal seat $a^2$, which is preferably of the tapering or beveled form shown in Figs. 3 and 5. The jaw-carrying section $b$ has projecting from its rear side a center $b'$, having a curved periphery bearing upon the seat $a^2$, the arrangement being such that the section $b$ can rock or oscillate freely in any direction upon said seat. The center $b'$ is yieldingly pressed against the seat $a^2$ by means of a spring $e$, interposed between a plate or washer $e'$ which bears against a shoulder on the section $a$, and a nut $e^2$ engaged with a bolt $e^3$ passing through an orifice in the center $b'$, said bolt having an enlarged head $e^4$ within the center. The spring $e$ acts to take up wear and compensate for imperfections in the construction.

$f$ represents a driver, consisting of an annular plate, provided at one side with ribs $f'$ $f'$, which closely fit slots $f^2$ formed in the section $a$ (Fig. 7), and upon its opposite side with ribs $f^3$ $f^3$, which enter slots $f^4$ $f^4$ (Fig. 3) in the rear side of the jaw-carrying section $b$, said slots and the ribs $f^3$ constituting a loose connection between the sections $a$ and $b$, whereby rotary motion is imparted to the section $b$ from the section $a$, and at the same time the section $b$ is permitted to rock or oscillate upon the seat $a^2$.

I I represent the work-holding jaws, which are here shown as provided with grooves $i'$ $i'$ on their inner faces, to engage the piece of work. Said jaws are fitted to slide between flanged guides $b^2$ $b^2$, affixed to or formed upon the section $b$, said guides having inwardly-projecting flanges $b^3$ at their outer edges. The jaws $i$ are provided with slots $i^2$, which closely fit the flanges $b^3$. The inner faces of the jaws are inclined relatively to the axis of the chuck, as shown in Fig. 3, so that only their outer ends bear upon the work interposed between the jaws. Said outer ends project considerably outside flanges $b^3$, so that the bearing of the jaws upon the work causes a binding pressure of the inner portions of the jaws upon the flanges $b^3$, said pressure being sufficient to lock the jaws to any position to which they may be adjusted. For adjusting the jaws, I provide a bolt $j$, having at one end a head $j'$, its other end being screw-threaded. The bolt passes loosely through the jaws, its head $j'$ bearing against one jaw, while its threaded portion is provided with a nut $j^2$ bearing upon the opposite jaw. A spring $j^3$, interposed between the jaws, presses the same outwardly, holding one jaw against the head $j'$ and the other against the nut $j^2$. Said spring is normally under compression, so that, when the bolt $j$ is rotated to move the nut $j^2$ outwardly, the spring forces the jaws apart, the spring yielding when the bolt is turned to move the nut inwardly and thus force the jaws together. I do not limit myself, however, to the described construction and arrangement of the work-holding jaws, and may provide the section $b$ with jaws of any other suitable construction and arrangement. The jaws, as here described, are very effective in operation, and adapted to be conveniently adjusted; hence I prefer their use to that of any other construction of which I am at present aware.

I believe it to be new with me to flexibly connect the work-holding jaws of a chuck with the part that gives rotary motion to the chuck under such an arrangement that the work held by the jaws may stand, while rotating, at an angle to the axis of the spindle. This improvement greatly facilitates the production of tapering work. Heretofore, in turning tapering work, it has been necessary in a turret machine either to cause the back-rest and the turning tool to be fed into the work simultaneously, or to cause the back-rest to precede the tool and bear on the surface that has been previously turned to a cylindrical form of uniform diameter from end to end. The simultaneous movement of the back-rest and tool into the work involves a complicated and impractical construction, while, in the mode of operation last mentioned, two separate cuts over the work are required, instead of one, the first to turn the work to a straight cylindrical form, and the second to produce the taper.

It will be seen that by the use of my improved chuck, a tapering surface may be produced by running the cutting tool back and forth in a line parallel with the axis of the spindle, the work being pressed out of alignment with the spindle when the tool is operating on the outer part of the work, and being in alignment with the spindle when the tool is operating on the inner part of the work, or that part nearest the chuck. In using this improved chuck, a fixed back-rest may be employed, the cutting tool alone being moved. The work rotates on its own axis while occupying a position at an angle to the axis of the chuck.

In Figs. 1 and 3, I show the section $a$ provided with an external sleeve $m$, which has a screw-thread engagement with the section $a$, and is adapted to be adjusted endwise, so that its inner end may bear against the rear side of the section $b$, thus supporting said section rigidly when it is not desired to produce a tapered surface.

I do not limit myself to the employment of the driver $f$, constructed as here shown and made in a separate piece from the section $a$. If desired, the ribs $f^3$, which enter the slots $f^4$ of the section $b$, may be formed on or rigidly attached directly to the section $a$.

I claim—

1. A wabble chuck comprising in its construction a supporting section, a jaw-carrying section flexibly connected with the supporting section, and projections on one section loosely engaged with slots or recesses in the other section, as set forth.

2. In a chuck, the combination of a supporting section, a jaw-carrying section flexibly connected with the supporting section and provided with work-holding jaws, and a driver engaged with the supporting section and loosely connected with the jaw-carrying section, as set forth.

3. In a chuck, the combination of a supporting section having an internal seat or socket, a jaw-carrying section rotatively engaged with the supporting section and provided with a projecting center fitted to turn on said seat, and means for yieldingly pressing the center against the seat, as set forth.

4. In a chuck, the combination of a supporting section having an internal seat or socket, a jaw-carrying section rotatively engaged with the supporting section and provided with a projecting center fitted to turn on said seat, a bolt engaged with said center and a spring interposed between a nut on said bolt and a washer bearing on the supporting section, as set forth.

5. In a chuck, the combination of a supporting section, a jaw-carrying section flexibly connected and rotatively engaged with the supporting section and extending laterally beyond the same, and an adjustable collar on the supporting section and arranged to abut the rear side of the laterally-extending portions of the jaw-carrying section, whereby the latter may be rigidly supported.

6. A chuck having parallel flanged guides, jaws fitted to slide on said guides, a bolt connecting said jaws and provided with an adjusting nut, and a spring interposed between the jaws, as set forth.

In testimony whereof I have signed my name to this specification, in the presence of two subscribing witnesses, this 15th day of November, A. D. 1892.

JAMES HARTNESS.

Witnesses:
E. A. HILLS,
W. D. WOOLSON.